(Model.)
W. S. BIGBY.
DENTAL DRILL.
No. 351,153. Patented Oct. 19, 1886.
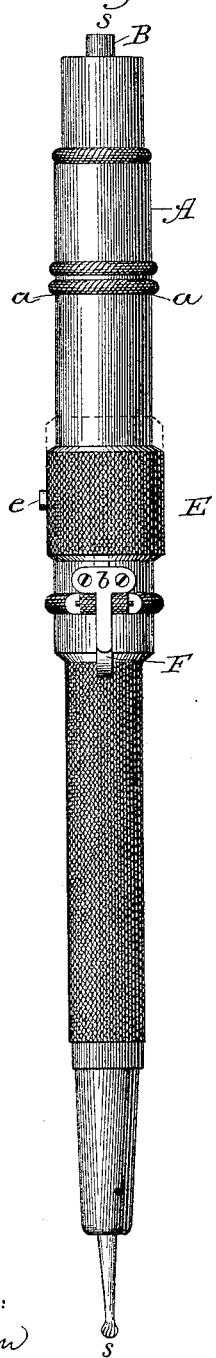
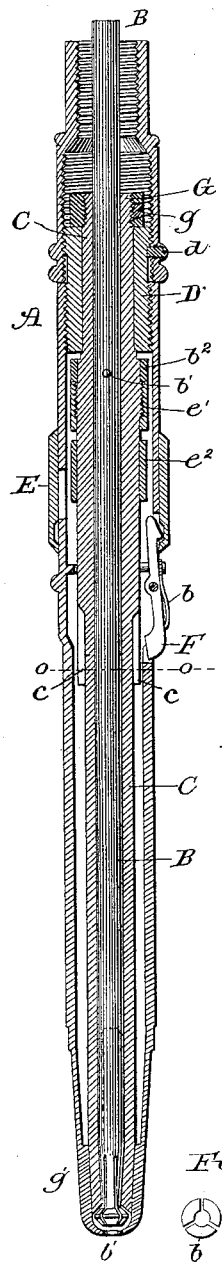
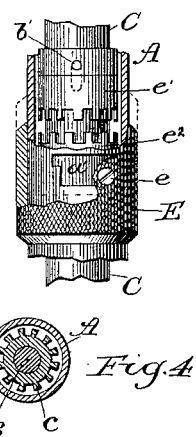
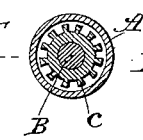
Witnesses:
Wuff Bowden
Clark Ennis
Inventor.
W S Bigby
p. John W Sutton
attorney

UNITED STATES PATENT OFFICE.

WILLIAM S. BIGBY, OF NEW YORK, N. Y.

DENTAL DRILL.

SPECIFICATION forming part of Letters Patent No. 351,153, dated October 19, 1886.

Application filed July 14, 1884. Serial No. 137,667. (Model.)

*To all whom it may concern:*

Be it known that I, WILLIAM S. BIGBY, a citizen of the United States, and a resident of the city, county, and State of New York, have invented a new and useful Improvement in Hand-Pieces for Dental Engines, of which the following is a specification.

My invention relates to dental-engine hand-pieces for carrying a drill or other rotating tool used by dentists in operations upon the teeth, in which the shank of the tool is held by lateral pressure by means of inclined or conical faces drawn together positively by a screw without the use of a spring.

My object is to get as long a bearing for the spindle and tool-holder as possible, so that the spindle shall run true and free, and to hold the burr or other tool central to the long spindle, so that the end or working part shall revolve perfectly true without wabble or chatter, and also to have the opening and closing of the jaws of the chuck or tool-holding apparatus positive in their movements, and to take in and hold true tools with different-sized shanks. I attain these results by mechanism illustrated in the accompanying drawings.

Figure 1 is a view in elevation. Fig. 2 is a longitudinal central section of the same on the lines $s\ s$. Fig. 3 is a view of the central portion, with some of the parts broken away to show the action of certain parts. Fig. 4 is a cross-section on the line $o\ o$. Fig. 5 is an end view of the jaws of the chuck or tool-holder.

Similar letters refer to similar parts throughout the several views.

A is the casing of the hand-piece, made in two tubular sections opening at $a\ a$.

B is the spindle, one end of which is to attach the flexible shaft from the motor. In this description this end will be called the "upper end." The other or lower end is made conical externally, and is bored out and split to form three jaws. These jaws are sprung outward slightly, and tempered, so as to be always in close contact with the internal coned surface of the hollow spindle C. This hollow spindle revolves with and is attached to B by the pin $b'$, that is firmly set in B, the ends passing through two longitudinal slots, one on each side of the hollow spindle C. These ends are firmly fastened in the sliding collar $b^2$, so that when the collar $b^2$ is moved up or down on the hollow spindle C the spindle B moves up or down with it; but both spindles rotate together. The inner walls of the lower end of C are of the same conical form as the ends of the spindle-jaws, so that as the spindle is drawn inward the jaws will close the opening $b$, and grasp firmly the shank of the tool when inserted. C rotates in a bearing, D, that is screwed into the case A, and is held in place by the set-screw $d$. Threaded upon the upper end of C is a bearing-collar, G, having in it a set-screw, $g$. Below the bearing D the hollow spindle is enlarged to give an endwise bearing. The threaded bearing-collar G makes the other endwise bearing, the screw-threads allowing the said bearing-collar to be adjusted very accurately, and the set-screw $g$ holding the collar in place. The other bearing of the hollow spindle $g'$ is near the lower end. The hollow spindle C at the lines $o\ o$ has cut into it a number of longitudinal notches, $c\ c$, as shown in the cross-section, Fig. 4.

E is a short sleeve surrounding the case A, and a set-screw, $e$, passes through a slot in the casing A and into the sliding toothed collar $e^2$, attaching the sleeve E and the collar $e^2$ firmly together.

$e'$ is a toothed nut that is threaded upon the hollow spindle C.

F is a dog pivoted in the case A, the lower end of which fits into the longitudinal notches $c\ c$ in C. The other end of the dog fits into an internal groove in the lower end of the sleeve E, when the said sleeve is in the position as shown in Fig. 2, holding the sleeve from moving. When E is slipped upward, the upper end of the dog is released, and the spring $f$ forces the lower end of the dog F into one of the longitudinal notches $c\ c$, thereby locking the hollow spindle C fast and preventing it from rotating. The upward movement of E, carrying the toothed collar $e^2$, brings the said $e^2$ in contact with and engages the teeth of the collar $e^2$ and the toothed nut $e'$ by means of the screw-threads on its inner surface and upon the hollow spindle C. The toothed nut will be forced up or down as the sleeve E may be turned. When the sleeve E has been turned as far as the slot $a'$ will allow, it can be drawn downward until the teeth are disengaged, then turned backward, then pushed upward, the teeth engaged, and the toothed nut turned again as far as the slot will allow, and separated until the amount of longitudinal movement required; but usually the slot is long enough to give all the motion required in one movement. The upper end of $e'$ is in contact with the sliding collar $b^2$, that is attached to B by the pin $b'$, and it follows that when the toothed nut $e'$ is turned so as to move longitudinally upward, the sliding collar $b^2$ and the spindle B will move the same distance, and the spindle, by means of its conical form at its lower end and the conical form of the hollow spindle, will force together the jaws, and if the movement of the sliding collar $b^2$ is downward the outward set of the jaws will draw the spindle downward as far as the toothed nut $e'$ will allow.

The slot $a'$ in the case A has a recess at one end for the screw $e$ to rest in, so that the sleeve E will not move when the burr or other tool is being inserted in $b$. A portion of the surface of the lower end of the case A and the surface of the sleeve E is knurled, to give a better grip than a smooth surface in handling the instrument.

To use the instrument, the parts being in the position as in Fig. 2, with a burr in place, the operator takes hold of the knurled portion of the hand-piece with the thumb and first two fingers of his left hand, and the sleeve with the thumb and first finger of his right hand. The sleeve is now drawn upward, and this releases the dog F, and the spring $f$ forces the lower end of the dog into one of the notches $c\ c$ in the hollow spindle C, that locks it fast. The upward movement of the sleeve has moved the sliding collar $e^2$ upward, and if the teeth have not met the spaces in the toothed nut $e'$ a slight rotary movement will cause them to engage, pushing them together. The sleeve is now turned upon the case, the top from the operator, until the screw $e$ is in the recess in the slot $a'$. This turns the toothed nut $e'$ upon the threads of the hollow spindle, and moves the said nut downward away from the collar $b^2$, releasing the spindle B. The jaws then open and draw the spindle B downward, releasing the grip upon the shank of the burr, which can now be removed and another inserted. When the burr is in place, the sleeve E is turned backward until the jaws grip the shank firmly, and the sleeve then is slipped downward to its place. This downward movement withdraws the toothed collar $e^2$ from $e'$, and as the edge of the sleeve passes over the upper end of the dog F it depresses that end and raises the other end out of the notch, releasing the hollow spindle C, leaving it and the burr free to revolve, and the knob on the upper end of the dog F enters the internal groove in the sleeve E, keeping it in its place.

I am aware that hand-pieces have been made for the purpose of holding burrs and other tools, as represented, for example, in the Letters Patent of the United States No. 199,469, No. 231,945, No. 261,795, and reissued Patent No. 10,115.

What I claim as my invention is—

1. The combination of an outer case, a hollow spindle fitted to revolve within the case, the sleeve E, with an internal groove, the dog F, spring $f$, and notches $c\ c$ in the hollow spindle, all substantially as shown, for the purpose specified.

2. The combination of an outer case, a hollow spindle fitted to revolve within the case, a spindle within the hollow spindle and revolving with it, with a gripping device or spring-jaws upon one end of it, the collar $b^2$, attached to it by the pin $b'$ and receiving a longitudinal movement by means of the toothed nut $e'$, the toothed collar $e^2$, the sleeve E, dog F, and notches $c\ c$ in the hollow spindle, all substantially as shown, for the purpose as specified.

In testimony that I claim the foregoing as my invention I have signed my name, in presence of two witnesses, this 11th day of July, 1884.

W. S. BIGBY.

Witnesses:
TH. W. KIMBELL,
J. CORBETT.